UNITED STATES PATENT OFFICE.

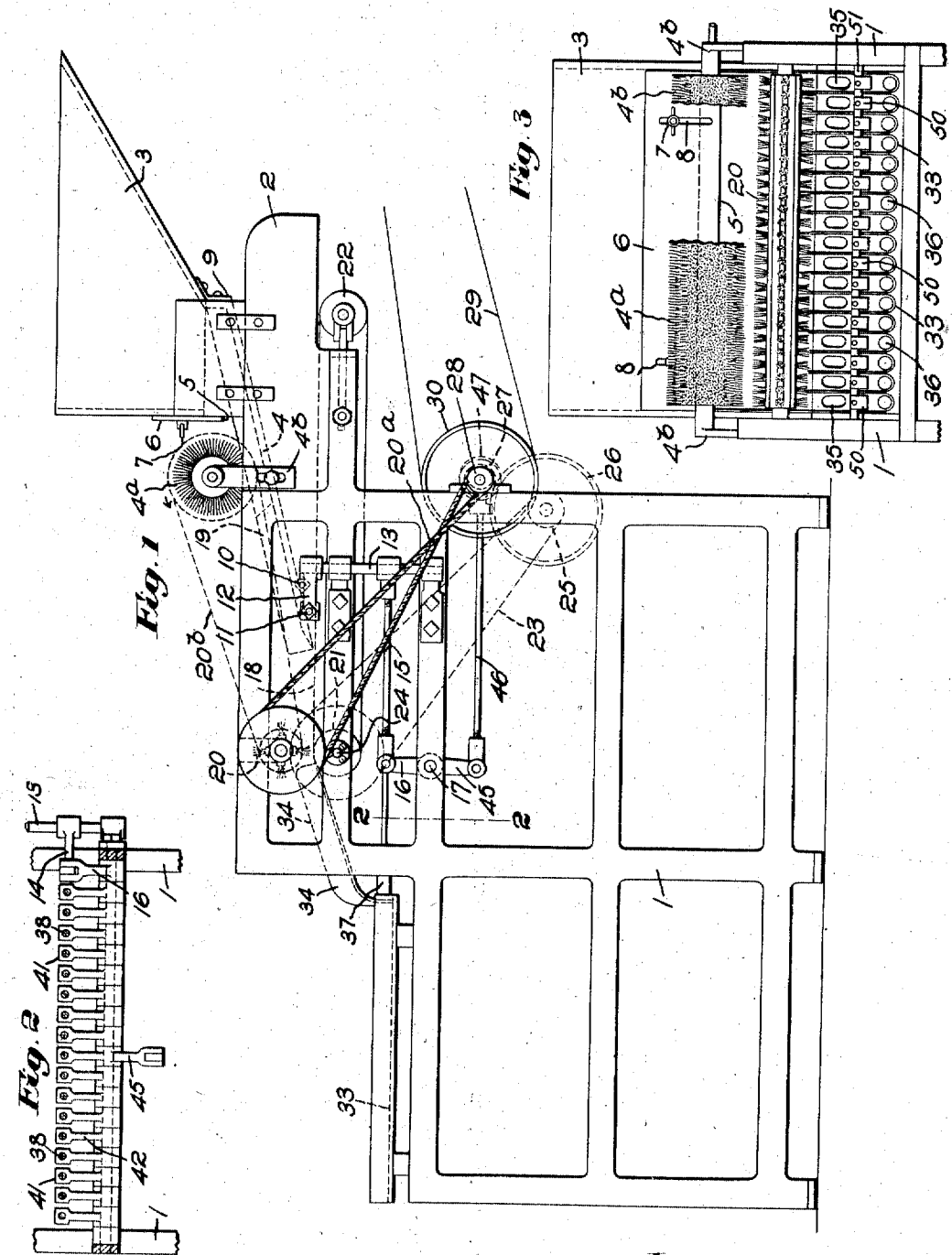

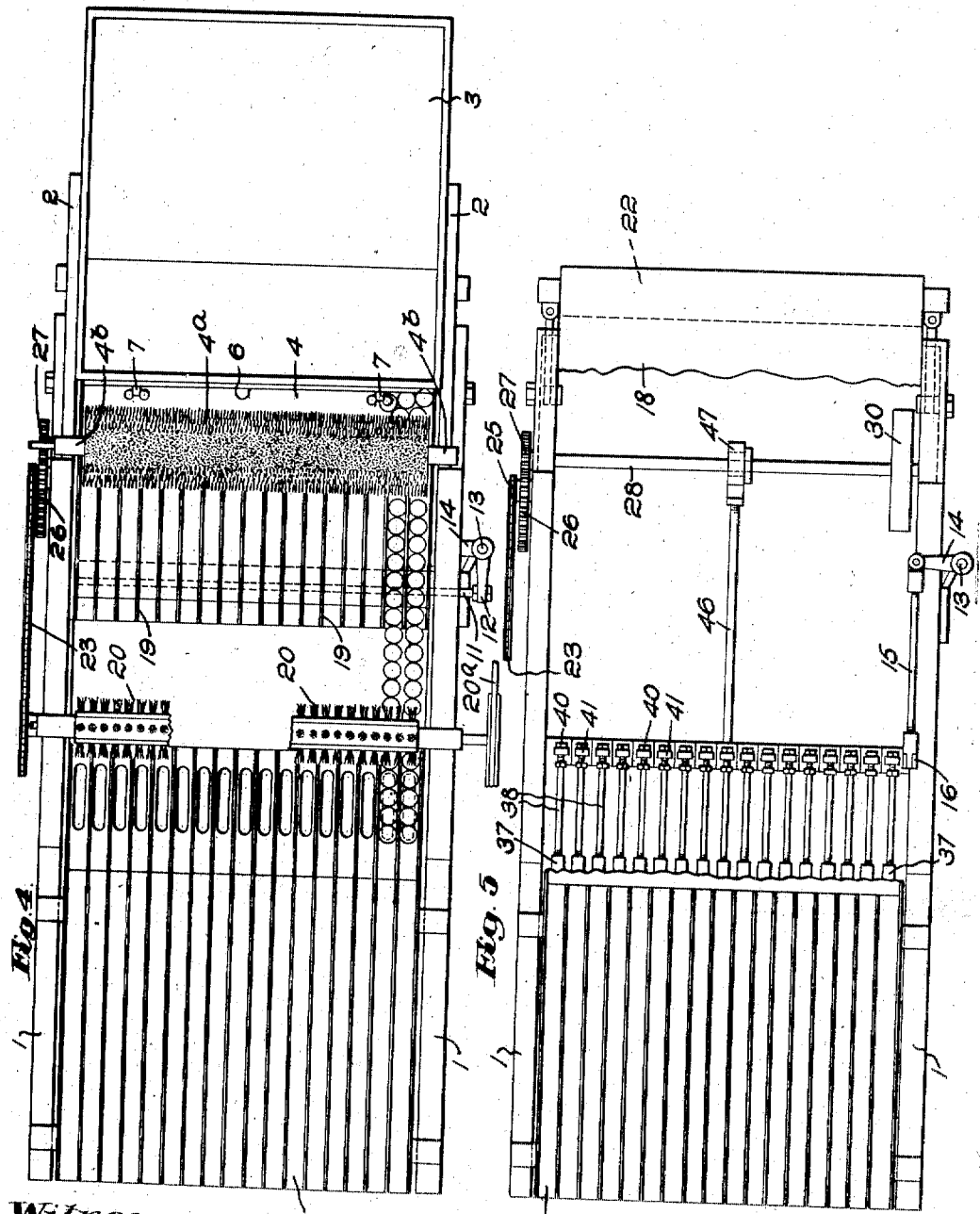

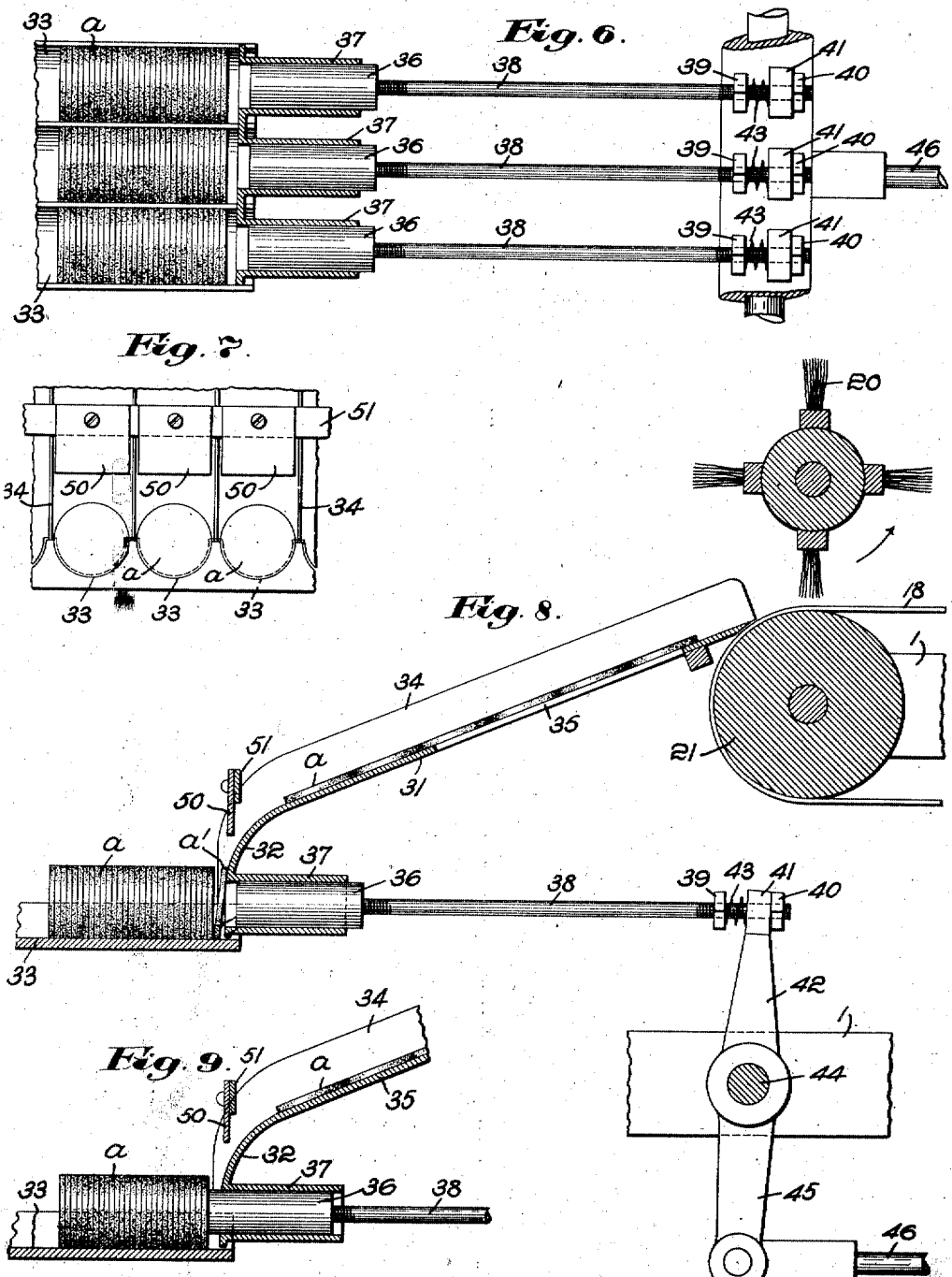

FREDERICK J. THOMAS, OF TAUNTON, MASSACHUSETTS, ASSIGNOR, BY MESNE ASSIGN-
MENTS, TO NEW ENGLAND CONFECTIONERY COMPANY, OF BOSTON, MASSACHU-
SETTS, A CORPORATION OF MASSACHUSETTS.

ASSEMBLING APPARATUS.

1,208,402.   Specification of Letters Patent.   Patented Dec. 12, 1916.

Application filed January 12, 1912. Serial No. 670,743.

*To all whom it may concern:*

Be it known that I, FREDERICK J. THOMAS, a citizen of the United States, and a resident of Taunton, county of Bristol, State of Massachusetts, whose post-office address is 108 West Britannia street, Taunton, Massachusetts, have invented an Improvement in Assembling Apparatus, of which the following description, in connection with the accompanying drawings, is a specification, like characters on the drawings representing like parts.

This invention consists of improvements in machines for assembling in compact relation a series of thin, flat articles such as wafers or the like.

In the disclosed embodiment of the invention the same is shown, for illustrative purposes, as applied to a machine for the assemblage of a stacked series of confectionery wafers, but it may have application to widely different purposes.

The invention will be best understood by reference to the following description when taken in connection with the accompanying illustration of one specific embodiment thereof, while its scope will be more particularly pointed out in the appended claims.

In the drawings, Figure 1 is a side elevation showing a machine embodying one form of the invention; Fig. 2 is an elevation in partial section taken on the line 2—2 in Fig. 1; Fig. 3 is a front elevation of a part of the machine illustrated in Fig. 1, showing the delivery parts for delivering the wafers to the stack-holding channels; Fig. 4 is a plan view of the machine shown in Fig. 1 showing a few of the wafers in process of advancement; Fig. 5 is a plan with the delivery parts removed showing the actuating mechanism below the same; Fig. 6 is a sectional detail in plan showing the vibrating plungers or tappers; Fig. 7 is an end view of several channels; Fig. 8 is an elevation in section taken through one of the plungers and the inclined guide therefor; and Fig. 9 is a view similar to Fig. 8 showing the plunger in its forward position.

Referring to the drawings and to the embodiment of the invention there illustrated, the latter is shown applied to a machine for assembling in compact stacked relation a series of flat, thin, disk-like wafers. The operation of assembling wafers of this type in a compact series preparatory to wrapping them in cylindrical packages consumes a great deal of time when done by hand and where a large bulk of such articles is handled. The described form of machine provides means for receiving such articles in bulk and automatically assembling them in a packed column or row, face to face, so that as each row or column is formed an appropriate number may be removed therefrom either by hand or automatically and wrapped into a cylindrical package in precisely the relation they occupy in the series.

Referring to the drawings and particularly to Figs. 1 to 5, inclusive, a frame 1 is provided, with the overhanging extension 2, on which is fixed a hopper 3 adapted to receive the wafers in bulk. Beneath the hopper there is placed an inclined tray 4 which substantially closes the bottom of the hopper except for a small space or outlet 5 at the front lower end of the hopper, the height of which outlet may be regulated by means of the vertically adjustable gate 6. The position of the latter can be regulated by the wing nuts 7 applied to bolts which pass through the vertical slots 8 in the gate. The rear end of the tray is hung upon or attached to the hopper by means of a single central hanger iron 9 or other suitable attachment and the lower end rests upon a transverse rod 10 secured to the frame so that a certain amount of lateral play or vibration is permitted the tray beneath the hopper.

The wafers are assisted in passing through the outlet 5 upon the tray by imparting to the latter a lateral vibratory movement so that the wafers tend to gravitate down the tray and out through the outlet 5 as the tray is shaken or vibrated. To vibrate the tray, the latter has attached thereto at its forward end (see Figs. 1 and 4) the lateral rod 11 connected to the arm 12, which latter is attached to the upright rock shaft 13. Near its lower end (see Fig. 5) the rock shaft 13 has fixed thereon the arm 14 connected to the vibratory rod 15, the latter in turn being attached to a rocker arm 16 on the horizontal rock shaft 17, the movement of which latter will be more fully referred to. If the wafers pass out of the hopper on to the tray piled up one on another, or if they tend to heap up on the tray, the upper wafers are pushed back so as to allow the passage of the undermost layer only. Any suitable means may be used for this purpose, such as the brush 4ª, which is rotated in the direction of the arrow, or reversely to the travel of the wafers, and the bristles of which pass above the tray leaving a clearance sufficient to allow the passage of one layer of wafers. Those which are heaped upon the lowermost layer are moved back toward the hopper until opportunity is offered for them to move down in contact with the tray itself. The brush is journaled in brackets 4ʰ which may be vertically adjusted to vary the height of the brush.

The wafers which gravitate down the tray are delivered flatwise in rows to an underlying horizontal feed apron 18. To assist in the formation of pronounced or defined rows before the wafers are delivered to the apron, they are first caused to pass into row-forming guides on the tray, such guides being formed by providing the wafer-traversed face of the same with longitudinal partition walls 19, so that a row formation is enforced upon the wafers gravitating down the tray and they are delivered to the apron in a series of separated rows.

To move the feed apron 18, the latter passes over rollers 21 and 22, the former being driven (see Figs. 1, 4 and 5) by any suitable means such as the chain 23, the driven sprocket wheel 24, and the driving sprocket wheel 25. The latter is on the same shaft with the gear 26 which in turn is driven by the pinion 27 on the main driving shaft 28, the latter being driven from any suitable source of power by means of the belt 29 and pulley 30.

When received by the feed apron 18 the wafers are carried along on suitable guiding devices in the direction of the arrow shown in Fig. 1 by which devices they are guided to and presented each one in succession to the rear end of a column consisting of wafers already stacked in fall to fall relation. Each wafer is presented between the end of the column and suitable devices which bring it into alinement and stacked relation with the column and which also preferably advance it with the column to make way for the next succeeding wafer. Referring to the drawings and particularly to Figs. 4 and 8, such guiding devices are in the form of inclined guides 31, the upper edges of which are beveled so as to lie close against the surface of the apron 18 near the forward end of the latter, and the opposite or lower ends of which terminate each in a sharp or abrupt incline 32 which serves to accelerate the descent of the wafer and also deposits it in a substantially upright position in the underlying stack holder or channel 33. Each guide consists of a bottom piece 31 and the sides 34 and is also preferably provided with an elongated discharge opening 35 of such shape and size as to pass broken wafers and pieces and deposit them below the guide and into any suitable underlying receptacle. This eliminates any broken pieces or chips which may pass from the hopper or which may become broken after leaving the hopper. The guides 31 are preferably, though not necessarily, the same in number as the row-forming guides on the tray and each one alines with a corresponding one on the tray so that each row of wafers delivered to the apron by the tray subsequently passes with certainty upon the corresponding and alined inclined guide 31.

If desired the partitions 19 on the tray may be omitted or may be differently spaced from the guides 31, so that the wafers are delivered to the apron without reference to the formation of pronounced rows. Under such conditions they readily find their way each into the mouth of one of the guides, being deflected toward the guide mouth by the ends of the guide sides 34 even though not directly alined with the guides. The feeding is assisted, however, by the formation of rows as described, and the row-forming guides are preferably employed as described.

To avoid the clogging or heaping up of the wafers at the mouths of the guides or the delivery to the guides of one wafer on top of another, means are preferably provided for working back upon the apron any wafers which accumulate at the entrance of the guides. For this purpose I have provided a brush 20 (see Fig. 8) which is located adjacent the mouths of the guides and which rotates in a direction opposed to the travel of the apron, leaving sufficient clearance only for a single wafer at a time to pass on the apron into each guide. The brush may be driven by any suitable means, as for example through the belt 20ª connected to a driving pulley on the shaft 28. The end of the brush shaft may be provided with a belt connection indicated at 20ᵇ for driving the brush 4ª.

The wafers travel down each row under the influence of gravity. Their gravity actuated descent may be assisted by the influence of the push given them by the uppermost wafer which is being delivered to the row by the traveling apron 18, or mechanical feeding means may be employed for this purpose. The inclination is preferably sufficient to cause them to travel easily but quickly down the incline until the abrupt inclination at 32 is reached.

When a wafer such as the one represented in Fig. 8 at *a* reaches the sharp incline 32, it drops quickly and almost instantaneously upon the underlying stack holder 33 falling in approximate upright position such as is assumed by the wafer designated a'. To prevent the wafer from overshooting the desired position in case its gravity-actuated descent along the incline 31 is too rapid, means may be employed to guide or direct it so that it will fall with certainty down the sharp incline 32 in an upright position as indicated. Herein for that purpose I have provided a flexible or yielding buffer deflector 50 comprising a small piece of felt or other similar yieldable material which is so held that the wafer descending the inclined guide 31 will strike the same and be deflected down the sharp incline 32 if its speed tends to carry it beyond the sharp incline. The soft and yielding nature of the felt prevents any injury or damage to the wafer. A strip or piece of felt 50 is held over each guideway by means of the transverse supporting rod 51.

To right the deposited wafer and bring it into stacked and alined relation with relation to the preceding column, means are provided at the back of the inclined guide and in alinement with the column to tap the back of the wafer and stack it against the column, such means also serving to advance the column to make way for the next wafer and change the relation of the wafers from that shown in Fig. 8 to that shown in Fig. 9. Any suitable means may be provided for this purpose, but herein a vibratory tapping plunger 36 is employed working in a cylindrical attachment 37 at the back and bottom of the inclined guide portion 32, one such plunger being provided for each guide, as represented in Fig. 6. Each plunger is preferably given a yieldable, reciprocatory movement of suitable extent by appropriate means such as the actuating rod 38 (Figs. 6 and 8), the forward end of which is fastened to the plunger and the opposite end of which is provided with spaced abutments such as the adjustable nuts 39 and 40. To vibrate the rod 38 the same passes loosely through the eye 41 of the rock lever 42, the eye being confined between the abutments 39 and 40, and the spring 43 being interposed between the eye and the abutment 39. As the lever arm 42 is rocked forward, therefore, it exerts a yieldable pressure against the plunger and moves the same from the position shown in Fig. 8 to that shown in Fig. 9.

Each lever arm 42 is mounted upon a rock shaft 44 which latter is reciprocated by means of the rock arm 45, the rod 46 and eccentric 47, the latter secured to the main power shaft 28. As the eccentric turns, each plunger is advanced from the position shown in Fig. 8 to that shown in Fig. 9 and then retracted to permit the succeeding wafer to descend. As the plungers are reciprocated they are caused to exert the required tapping movement upon each wafer as it drops, without, however, applying sufficient shock to break the same.

Each stack holder, as shown in Fig. 7, comprises a channel having a shape adapted to the shape of the wafers, and curvilinear in shape where wafers of the disk form are used, and is prolonged to a sufficient length to permit the formation of a column of wafers of any required number. The result is that in the series of parallel stack holding channels 33 there continue to be progressively formed parallel columns of wafers in stacked relation so that from them may be selected from time to time either automatically or manually the number of wafers required to constitute a package and in exactly the condition required for wrapping them. By increasing the width of the machine and the number of channel guides, the capacity of the machine may obviously be increased.

Candy wafers are customarily stamped out by suitable dies from a plastic mixture, and this process of formation results in a greater or less uniformity in the fragile product. This has made it difficult to stack wafers of this description but the above described machine is qualified to perform the operation effectively and with certainty. While the described embodiment of the invention is intended particularly for the handling of wafers of the described or similar type, it may be usefully employed for the stacking or packing of disk-like or thin, flat articles of other descriptions and the invention is in no wise limited to the particular use herein made of the same.

While I have herein shown and described for purposes of illustration one specific embodiment of the invention, it is to be understood that the same is not limited to the form or relative arrangement of parts or the details of construction shown, but that extensive deviations may be made therefrom without departing from the spirit thereof.

Claims:

1. In a machine for assembling wafers in stacked relation, the combination with a stack holder 33 having a series of grooves therein, of a corresponding series of inclined guides 31 leading to said grooves and having elongated openings 35 to discharge pieces of broken wafers therefrom, means 4, 19 to separate the wafers into rows and deliver the same to said inclined guides, means 20 to prevent accumulation of the wafers on the inclined guides, plungers 36 at the juncture of said stack holder and inclined guides, and means to reciprocate said plungers to advance the stacks in said grooves.

2. In a machine for assembling wafers in compact series, the combination with a stack-holder of delivery means therefor including a stationary inclined chute having an end portion formed to present an incline sharper than that of the body of the chute, a fixed deflector coöperating with said sharper incline for inverting the wafers from flat to upset position, a movable apron for delivering the wafers to said chute, a rotary brush located substantially at the juncture of said apron and chute and means for rotating said brush oppositely to the direction of travel of the wafers for preventing their piling on the chute.

3. In a machine for assembling thin, flat-like articles in compact series, the combination with a stack-holder of delivery means therefor including a hopper, a transversely vibratory tray having row forming guides for receiving the articles from said hopper, a rotary brush above said tray for preventing the piling up of the articles on said tray, a chute, an apron for conveying the articles from said tray to said chute, and a rotary brush located substantially at the juncture of said apron and chute for preventing the piling up of the articles on the latter.

4. In a machine for assembling wafers in stacked relation, the combination with a stack holder of an inclined guide having an abruptly inclined delivery end adapted to deliver wafers in succession to said stack holder, means for feeding wafers to said guide, and reciprocatory stacking means comprising a plunger alined with said stack holder and adapted to engage the back of the deposited wafer and means for yieldably moving said plunger.

In testimony whereof I have signed my name to this specification in the presence of two subscribing witnesses.

FREDERICK J. THOMAS.

Witnesses:
  PHILIP ATWATER,
  ERNEST V. NORMAN.

It is hereby certified that in Letters Patent No. 1,208,402, granted December 12, 1916, upon the application of Frederick J. Thomas, of Taunton, Massachusetts, for an improvement in "Assembling Apparatus," errors appear in the printed specification requiring correction as follows: Page 1, line 62, for the word "packed" read *stacked;* page 2, line 75, for the word "through" read *though;* and that the said Letters Patent should be read with these corrections therein that the same may conform to the record of the case in the Patent Office.

Signed and sealed this 23d day of January, A. D., 1917.

[SEAL.]

F. W. H. CLAY,
*Acting Commissioner of Patents.*

Cl. 107—45.